US012565793B2

(12) United States Patent
Chen

(10) Patent No.: US 12,565,793 B2
(45) Date of Patent: Mar. 3, 2026

(54) BATHROOM LOCK STRUCTURE

(71) Applicant: ZHONGSHAN HYDI ARROW LOCK CO.,LTD, Zhongshan (CN)

(72) Inventor: Qiang Chen, Zhongshan (CN)

( * ) Notice: Subject to any disclaimer, the term of this patent is extended or adjusted under 35 U.S.C. 154(b) by 0 days.

(21) Appl. No.: 18/888,780

(22) Filed: Sep. 18, 2024

(65) Prior Publication Data

US 2025/0376874 A1 Dec. 11, 2025

(30) Foreign Application Priority Data

Jun. 6, 2024 (CN) ......................... 202421294500.6

(51) Int. Cl.
*E05B 13/00* (2006.01)
*E05B 41/00* (2006.01)

(52) U.S. Cl.
CPC ............ *E05B 41/00* (2013.01); *E05B 13/002* (2013.01)

(58) Field of Classification Search
CPC ............................... E05B 41/00; E05B 13/002
See application file for complete search history.

(56) References Cited

U.S. PATENT DOCUMENTS 1,919,750 A * 7/1933 Rymer .................. E05B 55/005 70/149
4,813,723 A * 3/1989 Anderson ................. E05C 1/14 292/336.3
5,460,417 A * 10/1995 Zuckerman ........... E05B 13/106 292/169.14
6,860,529 B2 * 3/2005 Chong .................... E05C 1/163 292/169.18
10,711,485 B2 * 7/2020 Li ......................... E05B 1/0007
10,837,199 B2 * 11/2020 Ou ........................ E05B 55/005
2009/0056391 A1 * 3/2009 Mathachan ........... E05B 13/002 70/91
2012/0017657 A1 * 1/2012 Chen ..................... E05B 13/101 70/91
2019/0234108 A1 * 8/2019 Li ........................ E05B 17/2007
2020/0109578 A1 * 4/2020 Lunday ................. E05B 55/005

* cited by examiner

*Primary Examiner* — Kristina R Fulton
*Assistant Examiner* — Thomas L Neubauer
(74) *Attorney, Agent, or Firm* — Abd Almonem Doolaanea

(57) ABSTRACT

A bathroom lock structure is provided, which includes an outdoor handle and an indoor handle. The indoor handle is provided with a knob with a spiral groove, a deblocking button in the indoor handle can be slid to cause a column on the deblocking button to be clamped in the spiral groove, a safety rod located in a first square hole within in the knob is driven to rotate. A locking cam in a shielding cover on the outdoor handle is driven to rotate by a rotation of the safety rod, thereby achieving locking or unlocking function. This bathroom lock structure achieves reliable locking and unlocking functions through exquisite mechanical design, thereby improving flexibility and convenience of use. The state of the lock can be observed through a display hole on the outdoor handle, allowing a user to clearly understand a current state of the lock.

6 Claims, 10 Drawing Sheets

BATHROOM LOCK STRUCTURE

CROSS-REFERENCE TO RELATED APPLICATIONS

This application claims priority to Chinese Patent Application No. 202421294500.6, filed on Jun. 6, 2024, which is hereby incorporated by reference in its entirety.

TECHNICAL FIELD

The present disclosure relates to the field of bathroom lockset technologies, and in particular, to a bathroom lock structure.

BACKGROUND

A bathroom lock structure is usually installed on a bathroom door to ensure privacy and safety when using the bathroom. This lock structure can prevent others from accidentally entering the bathroom, and also prevent the door from being accidentally opened while using the bathroom. This can ensure sufficient privacy and security in the bathroom.

At present, most bathroom locks on the market cannot display current unlocking/locking states of the door lock, which renders it difficult for a user to understand the state of the door lock in real time, which may affect the user experience and safety. The common locking way is to turn a knob on a handle indoor, and an emergency unlocking function outdoor is to turn the outdoor knob, which is not convenient enough.

SUMMARY

In order to compensate for the shortcomings of existing technology, the present disclosure proposes a bathroom lock structure.

To achieve the above objectives, the present disclosure provides the following technical solutions.

A bathroom lock structure, including an outdoor handle and an indoor handle, where the indoor handle is provided with a knob with a spiral groove; a deblocking button in the indoor handle is capable of being slid to cause a column on the deblocking button to be clamped in the spiral groove so as to drive a safety rod located in a first square hole of the knob to rotate; a locking cam in a shielding cover on the outdoor handle is driven to rotate by a rotation of the safety rod, thereby achieving a locking or an unlocking function.

The deblocking button is provided on a side of the indoor handle, and sliding the deblocking button can achieve locking/unlocking operations.

In some embodiments of the present disclosure, the outdoor handle is provided with a cam and a display block that is inserted at a tail part of the cam and having a torsion spring; one end of the safety rod away from the first square hole is installed in a second square hole of the cam; the rotation of the safety rod drives the cam to rotate so that a black surface or a red surface on the display block is aligned with a display hole on the outdoor handle.

In some embodiments of the present disclosure, the torsion spring on the display block drives a torsion arm of the display block to be contacted with an inclined surface of the cam.

In some embodiments of the present disclosure, it is in an unlocking state when the black surface on the display block is aligned with the display hole on the outdoor handle.

In some embodiments of the present disclosure, it is in a locking state when the red surface on the display block is aligned with the display hole on the outdoor handle.

A small hole on the outdoor handle is the display hole, through which the black surface or the red surface can be observed, thereby indicating an unlocking/locking state and indicating whether there is someone inside.

In some embodiments of the present disclosure, the outdoor handle is provided with an emergency unlocking mechanism, and the emergency unlocking mechanism is composed of a handle sleeve and a reset spring; when the display block is pressed down, a spiral slope on the cam comes into contact with a protrusion on the handle sleeve, the cam is caused to rotate and the safety rod is driven to rotate for emergency unlocking.

In some embodiments of the present disclosure, when releasing a pressed display block, the cam is reset under an action of the reset spring.

In the outdoor display hole, a cylindrical object is used to press down, and the display block is pressed down, then it can unlock from outside in case of emergency.

Compared with existing technologies, the technical effects and advantages of the present disclosure are as following.

In this bathroom lock structure, when the deblocking button on the indoor handle is pushed, the column on the deblocking button is clamped in the spiral groove of the knob, the knob is driven to rotate. The knob drives the safety rod in the first square hole to rotate, which in turn drives the locking cam inside the shielding cover on the outdoor handle to rotate, thereby achieving the locking or unlocking function.

In this bathroom lock structure, when the safety rod is rotated, the locking cam is driven to rotate, thereby achieving the locking function. At the same time, the safety rod is connected to the cam through the second square hole, and the cam is driven to rotate. The inclined surface on the cam contacts the torsion arm on the display block, the display block is driven to rotated at angles. When the cam rotates to a specific angle, the black or red surface on the display block is aligned with the display hole on the outdoor handle, thereby indicating a current state as locking or unlocking.

When an emergency unlocking is required, the display block is pressed down through the display hole with a circular rod, so that the spiral slope on the cam contacts the protrusion on the handle sleeve. In this way, the cam is rotated, and the safety rod is driven to rotate, achieving the emergency unlocking function. After releasing the pressed circular rod, the entire cam structure returns to its original position and is reset by the reset spring.

This bathroom lock structure achieves reliable locking and unlocking functions through exquisite mechanical design, and also has emergency unlocking function, thereby improving the flexibility and convenience of use. The states of the lock can be observed through the display hole on the outdoor handle, allowing a user to clearly understand the current state of the lock and increase security. An overall structural design is reasonable, it is easy to operate, and improves the user experience.

Figure 1:
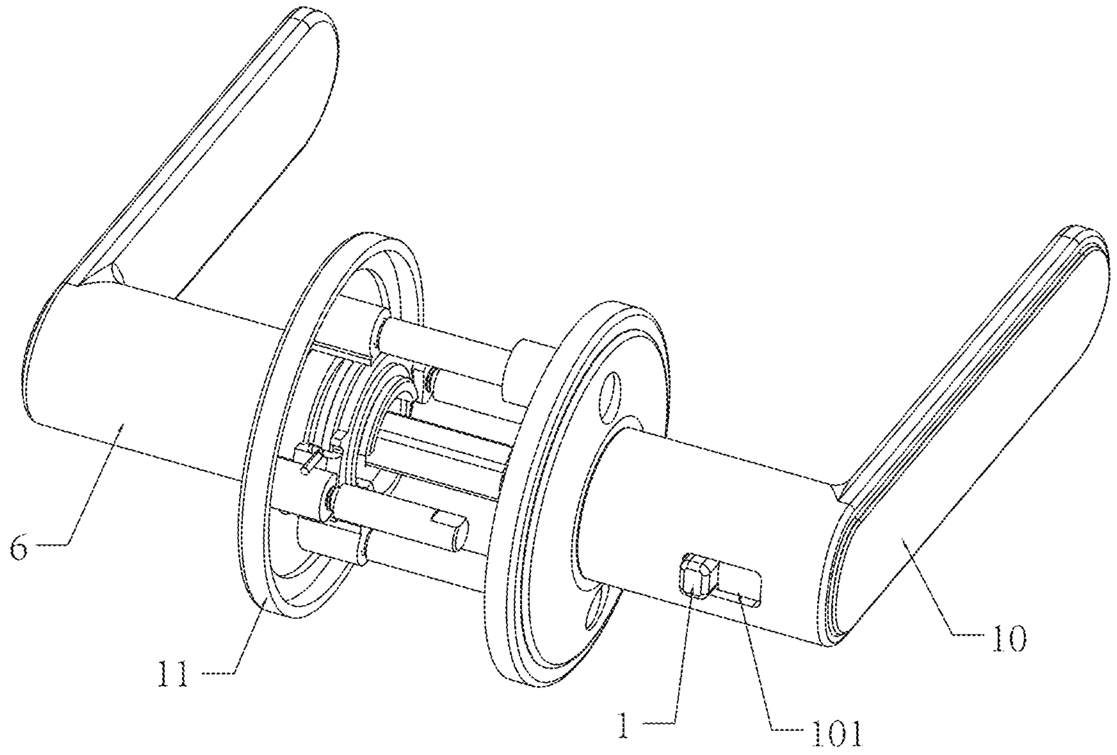
FIG. 1 is a schematic structural diagram of the present disclosure.
Figure 2:
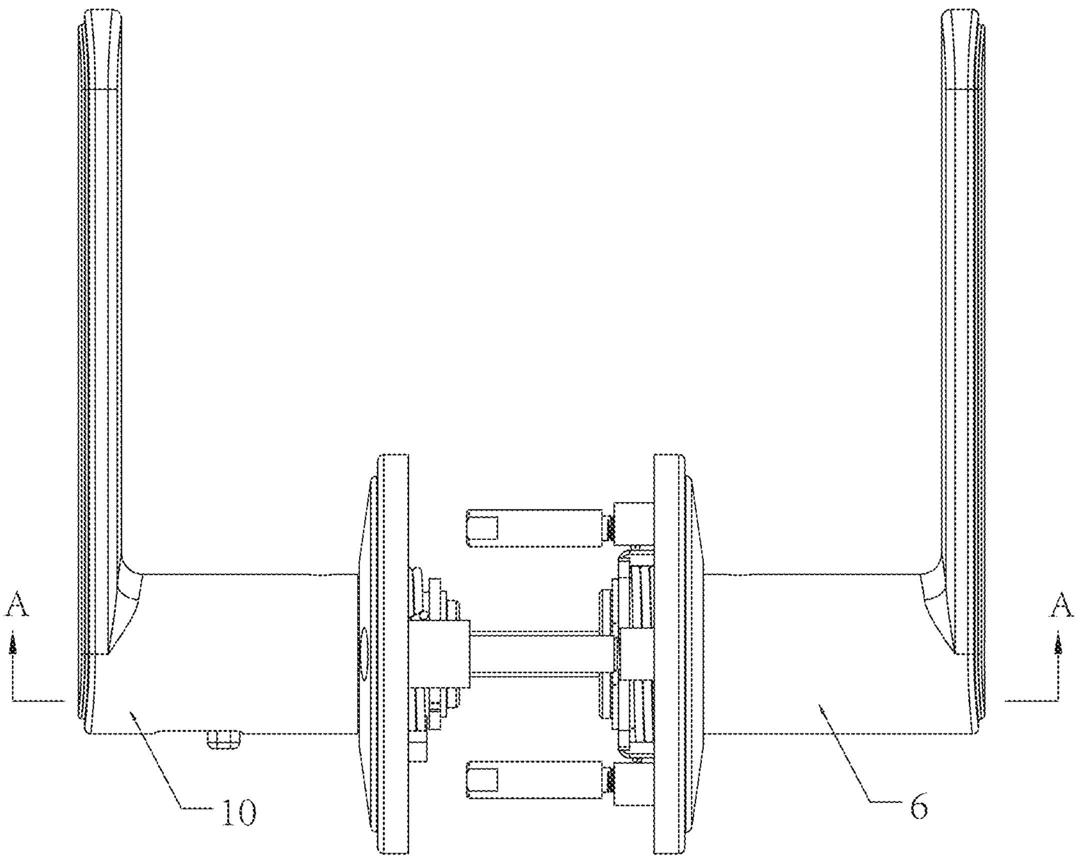
FIG. 2 is a bottom view of FIG. 1 of the present disclosure.

Numeral reference: 1—deblocking button; 12—column; 2—knob; 22—spiral groove; 23—first square hole; 3—safety rod; 4—cam; 41—second square hole; 42—inclined surface; 43—spiral slope; 5—display block; 51—torsion arm; 52—black surface; 53—red surface; 54—torsion spring; 6—outdoor handle; 61—display hole; 7—locking cam; 8—handle sleeve; 81—protrusion; 9—reset spring; 10—indoor handle; 101—notch; 11—shielding cover; 100—circular rod.

DESCRIPTION OF EMBODIMENTS

The following will provide a clear and complete description of the technical solution in the embodiments of the present disclosure, based on the accompanying drawings. Obviously, the described embodiments are only a part of the embodiments of the present disclosure, not all of them. Based on the embodiments in the present disclosure, all other embodiments obtained by those skilled in the art without creative work are within the protection scope of the present disclosure.

The present application will be further described in detail with reference to FIGS. 1-10.

The embodiments of the present disclosure provide a bathroom lock structure, including an outdoor handle 6 and an indoor handle 10.

One side of the indoor handle 10 has a deblocking button 1 that slides along a notch 101 on it. One side of the deblocking button 1 away from the notch 101 is fixedly connected to a column 12 that is clamped in a spiral groove 22 on the knob 2. The column 12 drives a safety rod 3 on the outdoor handle 6 to rotate through a first square hole 23 on its central axis. A rotation of the safety rod 3 drives a locking cam 7 inside a shielding cover 11 on the outdoor handle 6 to rotate, achieving the locking or unlocking function.

The outdoor handle 6 is provided with a display hole 61, and the outdoor handle 6 is provided with a cam 4 and a display block 5 with a torsion spring 54. The safety rod 3 is installed in a second square hole 41 of the cam 4, the rotation of the safety rod 3 drives the cam 4 to rotate, and the torsion arm 51 of the display block 5 is driven to contact an inclined surface 42 of the cam 4.

A display surface on the display block 5 can be observed through the display hole 61, a display surface on the display block 5 includes a black surface 52 and a red surface 53.

A handle sleeve 8 provided on the outer handle 6 is provided with a protrusion 81 that cooperates with a spiral slope 43 on the cam 4. The display block 5 is pressed down through the display hole 61, so that the spiral slope 43 on the cam 4 comes into contact with the protrusion 81 on the handle sleeve 8, the cam 4 is caused to rotate and the safety rod 3 is driven to rotate, thereby achieving an emergency unlocking function.

A return spring 9 is provided between the cam 4 and the shielding cover 11, which is sleeved on an outer side of the safety rod 3 and limited within the handle sleeve 8.

Figure 3:
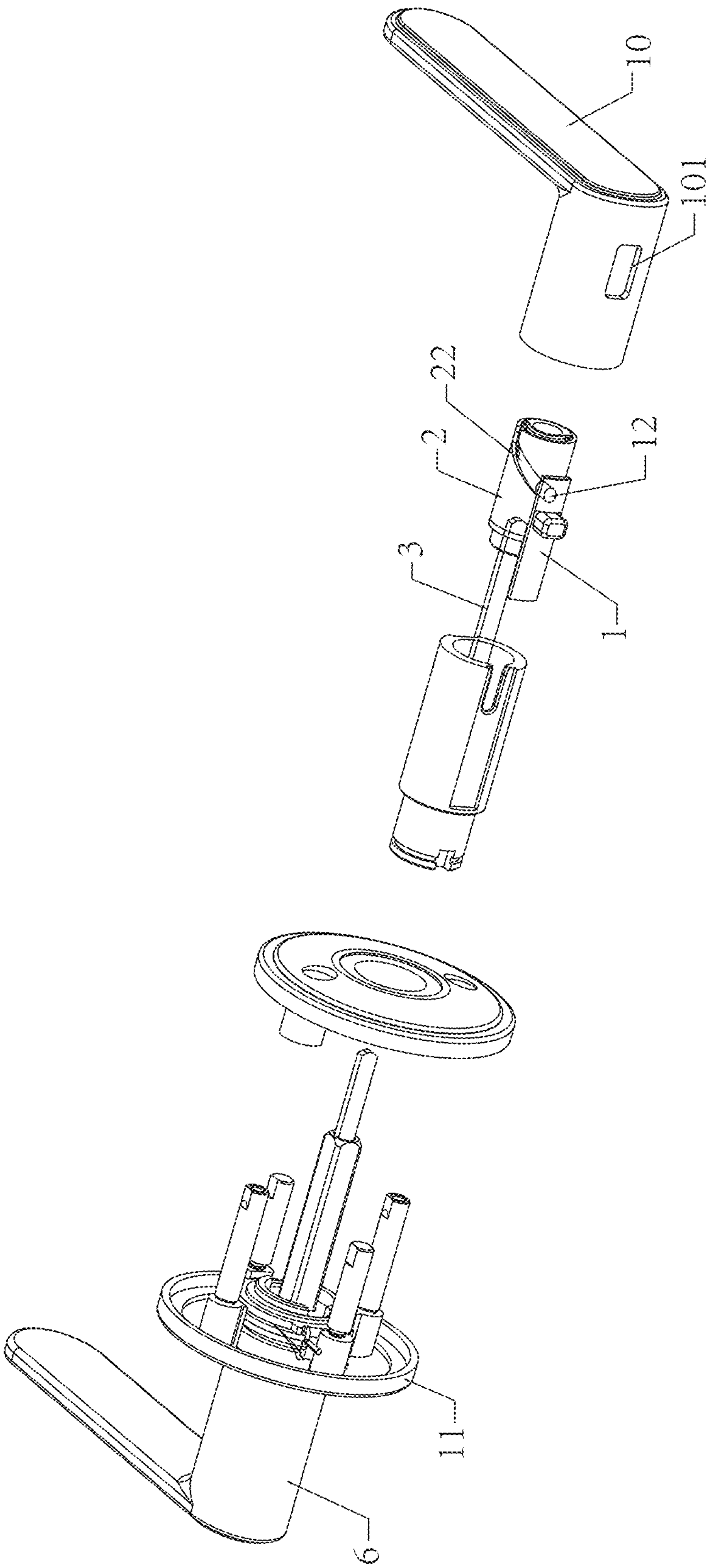
FIG. 3 is an exploded view of the present disclosure.

As shown in FIG. 3, when the deblocking button 1 is pushed to slide, the column 12 on the deblocking button 1 is clamped into the spiral groove 22 of the knob 2, the knob 2 is driven to rotate. The knob 2 drives the safety rod 3 to rotate through the first square hole 23, thereby achieving the locking/unlocking function.

Figure 4:
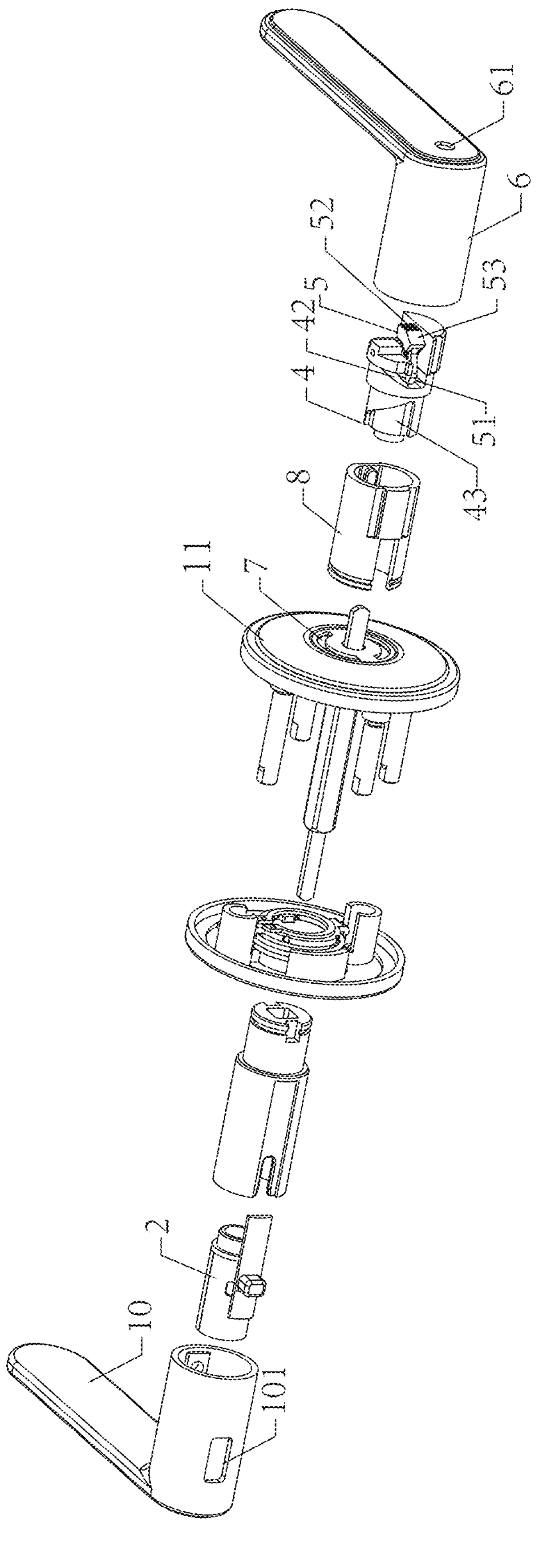
FIG. 4 shows an unlocking state diagram of the present disclosure.

As shown in FIG. 4, after the safety rod 3 rotates, the locking cam 7 inside the shielding cover 11 is rotated so as to achieve the unlocking/locking function. At the same time, the safety rod 3 is connected to the cam 4 through the second square hole 41 so as to drive the cam 4 to rotate. At the same time, there is a torsion spring 54 on the display block 5, which drives a torsion arm 51 of the display block 5 to contact the inclined surface 42 of the cam. When the cam 4 rotates to an angle shown in FIG. 3, the black surface 52 of the display block 5 is aligned with the display hole 61 on the outdoor handle 6, thereby indicating a current state to be unlocking.

Figure 5:
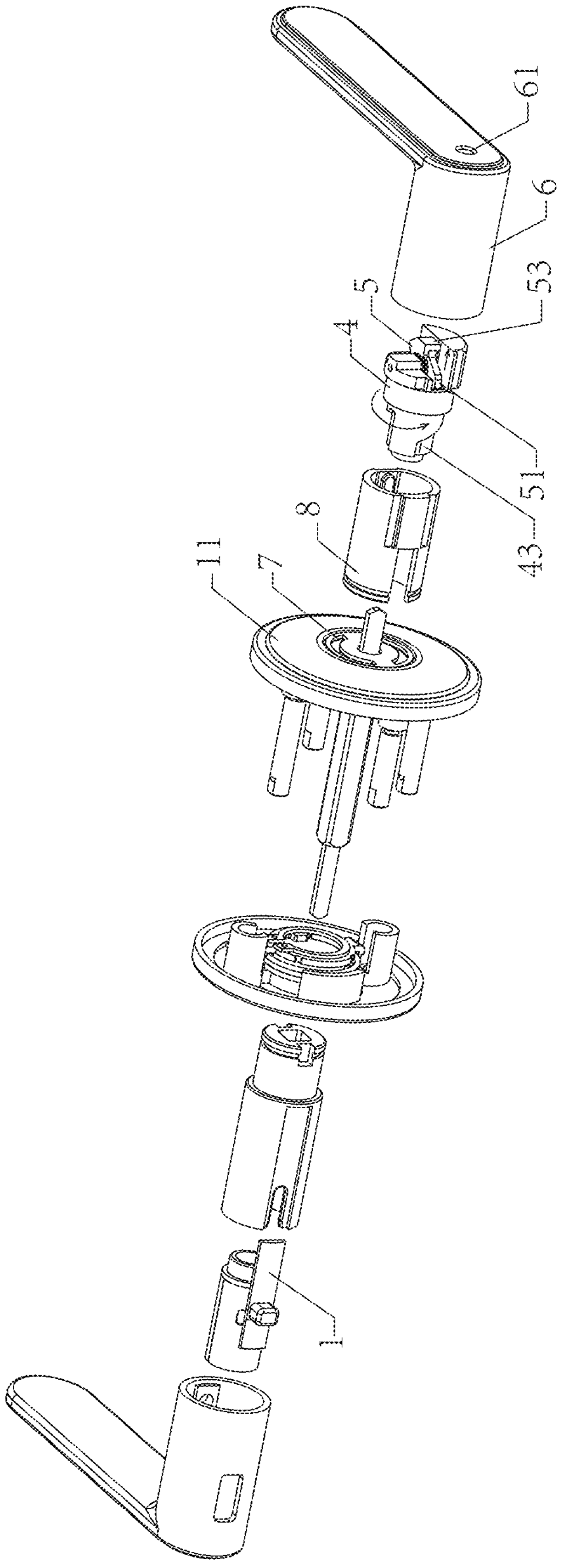
FIG. 5 shows a locking state diagram of the present disclosure.

As shown in FIG. 5, when the cam 4 rotates to a position shown in FIG. 5, under an action of the inclined surface 42, the display block 5 is rotated by an angle, and the red surface 53 is aligned with the display hole 61 on the outdoor handle 6, which indicates that the current state is locking.

Figure 6:
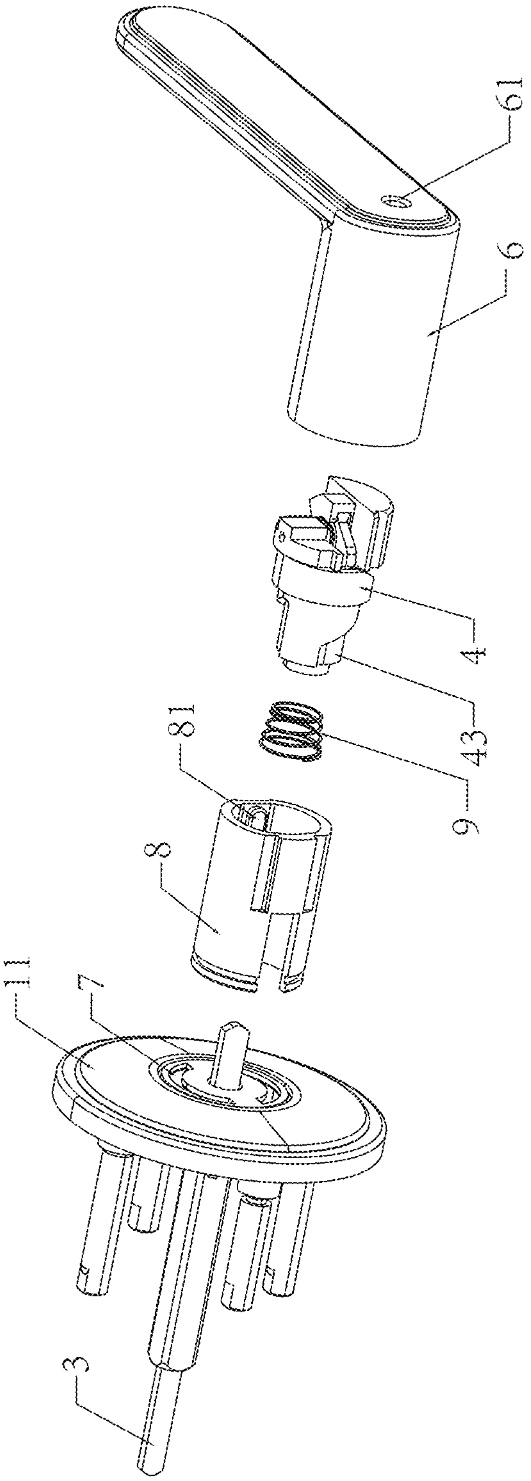
FIG. 6 is an exploded view of an outdoor handle of the present disclosure.
Figure 7:
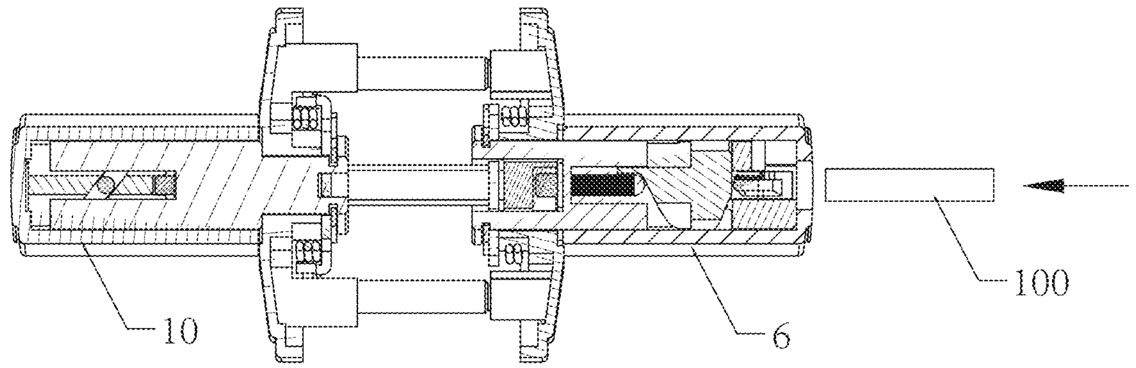
FIG. 7 is a cross-sectional view taken along line A-A in FIG. 2 of the present disclosure.
Figure 8:
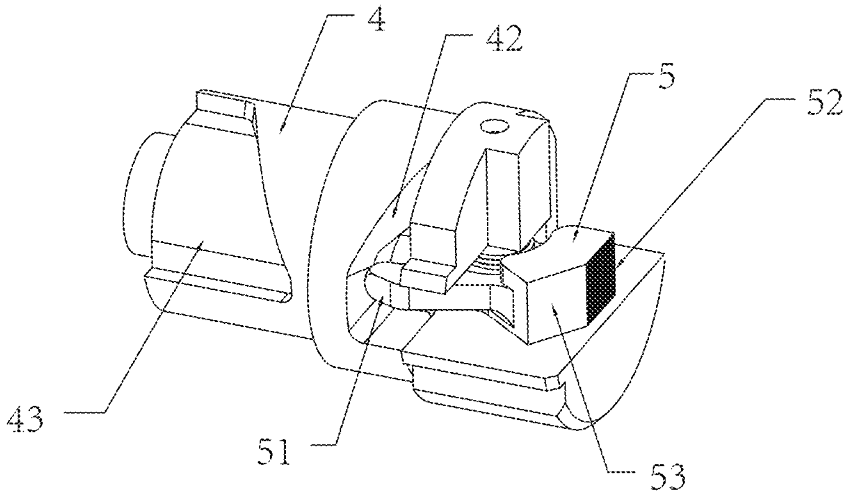
FIG. 8 is a schematic structural diagram of a cam and a display block of the present disclosure.
Figure 9:
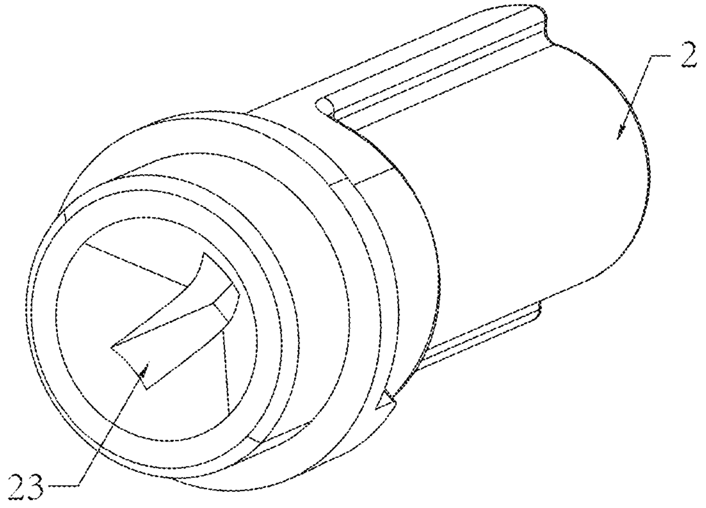
FIG. 9 is a schematic structural diagram of a knob of the present disclosure.
Figure 10:
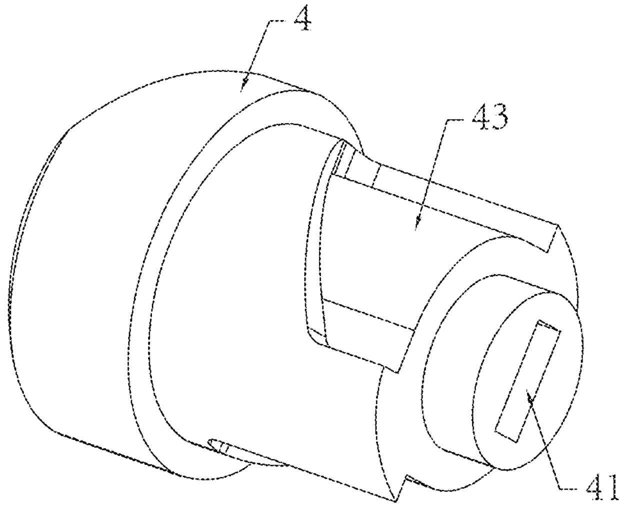
FIG. 10 is a schematic structural diagram of the cam of the present disclosure.

As shown in FIGS. 6-7, a circular rod 100 is used to press down the display block 5 through the display hole 61. The spiral slope 43 on the cam 4 contacts the protrusion 81 on the handle sleeve 8, the cam 4 is caused to rotate and the safety rod 3 is driven to rotate, achieving the emergency unlocking function. After releasing a pressed circular rod 100, the entire cam 4 structure returns to its original position under an action of the reset spring 9.

The bathroom lock structure includes an outdoor handle 6 and an indoor handle 10. The indoor handle 10 has a deblocking button 1 with a notch 101 along its side, which can drive a locking mechanism of the lock so as to achieve locking or unlocking functions. The state of the lock can be displayed through the display block 5 on the outdoor handle 6, where the black surface 52 represents the unlocking state and the red surface 53 represents the locking state.

The design of this bathroom lock achieves safe and reliable locking function through a complex mechanical structure, can be quickly unlocking through specific operations in emergency situations. The overall structural design is reasonable, it is easy to operate, and improves the user experience and safety.

Finally, it should be noted that the above description is only preferred embodiments of the present disclosure and is not intended to limit the present disclosure. Although the present disclosure has been described in detail with reference to the aforementioned embodiments, those skilled in the art may still modify the technical solutions described in the aforementioned embodiments or equivalently replace some of the technical features. Any modifications, equivalent replacements, improvements, etc. made within the spirit and principles of the present disclosure should be included in the protection scope of the present disclosure.

What is claimed is:

1. A bathroom lock structure, comprising: an outdoor handle and an indoor handle, wherein the indoor handle is provided with a knob with a spiral groove; a deblocking button in the indoor handle is capable of being slid to cause a column on the deblocking button to be clamped in the spiral groove so as to drive a safety rod located in a first square hole of the knob to rotate; a locking cam in a shielding cover on the outdoor handle is driven to rotate by a rotation of the safety rod, thereby achieving a locking or an unlocking function;

wherein the outdoor handle is provided with a cam and a display block that is inserted at a tail part of the cam and having a torsion spring;

one end of the safety rod away from the first square hole is installed in a second square hole of the cam;

the rotation of the safety rod drives the cam to rotate so that a black surface or a red surface on the display block is aligned with a display hole on the outdoor handle.

2. The bathroom lock structure according to claim 1, wherein the torsion spring on the display block drives a torsion arm of the display block to be contacted with an inclined surface of the cam.

3. The bathroom lock structure according to claim 2, wherein it is in an unlocking state when the black surface on the display block is aligned with the display hole on the outdoor handle.

4. The bathroom lock structure according to claim 2, wherein it is in a locking state when the red surface on the display block is aligned with the display hole on the outdoor handle.

5. The bathroom lock structure according to claim 1, wherein the outdoor handle is provided with an emergency unlocking mechanism, and the emergency unlocking mechanism is composed of a handle sleeve and a reset spring;

when the display block is pressed down, a spiral slope on the cam comes into contact with a protrusion on the handle sleeve, the cam is caused to rotate and the safety rod is driven to rotate for emergency unlocking.

6. The bathroom lock structure according to claim 5, wherein when releasing a pressed display block, the cam is reset under an action of the reset spring.

* * * * *